(12) United States Patent
Katte et al.

(10) Patent No.: US 8,775,488 B2
(45) Date of Patent: Jul. 8, 2014

(54) SYSTEM AND METHOD FOR DATA CACHING

(75) Inventors: Satish Katte, Troy, MI (US); Timothy Gourley, Cincinnati, OH (US); Louis Boydstun, Wyoming, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 233 days.

(21) Appl. No.: 13/081,933

(22) Filed: Apr. 7, 2011

(65) Prior Publication Data

US 2011/0258243 A1  Oct. 20, 2011

Related U.S. Application Data

(60) Provisional application No. 61/324,073, filed on Apr. 14, 2010.

(51) Int. Cl.
*G06F 17/30* (2006.01)

(52) U.S. Cl.
USPC .......................................... 707/827; 717/178

(58) Field of Classification Search
USPC ............ 709/203; 726/1; 707/5, 827, 759, 103
See application file for complete search history.

(56) References Cited

U.S. PATENT DOCUMENTS

| | | | | |
|---|---|---|---|---|
| 6,038,399 A * | 3/2000 | Fisher et al. | | 717/178 |
| 6,697,806 B1 * | 2/2004 | Cook | | 1/1 |
| 7,451,225 B1 | 11/2008 | Todd et al. | | |
| 7,610,259 B2 * | 10/2009 | Yuda et al. | | 1/1 |
| 7,882,538 B1 * | 2/2011 | Palmer | | 726/1 |
| 8,332,420 B2 * | 12/2012 | Kaiser | | 707/759 |
| 8,364,611 B2 * | 1/2013 | Tendjoukian et al. | | 706/12 |
| 2003/0120593 A1 * | 6/2003 | Bansal et al. | | 705/39 |
| 2003/0187984 A1 | 10/2003 | Banavar | | |
| 2005/0086257 A1 * | 4/2005 | Wright | | 707/103 R |
| 2007/0067821 A1 * | 3/2007 | Fang | | 726/1 |
| 2007/0136533 A1 | 6/2007 | Church | | |
| 2008/0201321 A1 * | 8/2008 | Fitzpatrick et al. | | 707/5 |
| 2008/0288486 A1 * | 11/2008 | Kim et al. | | 707/5 |
| 2011/0208808 A1 * | 8/2011 | Corbett | | 709/203 |

OTHER PUBLICATIONS

PCT International Search Report dated Aug. 9, 2011 corresponding to PCT Application No. PCT/US2011/032266 filed Apr. 13, 2011 (8 pages).

* cited by examiner

*Primary Examiner* — James Trujillo
*Assistant Examiner* — Thong Vu

(57) ABSTRACT

Systems, methods, and computer readable mediums. A method includes receiving a first pre-caching rule from a policy database, receiving first data corresponding to the first pre-caching rule, and transmitting the first data to a file server cache (FSC) to be pre-cached on the FSC. The method may also include receiving a request for second data from the FSC and receiving a second pre-caching rule from the policy database. The second pre-caching rule specifies third data to be pre-cached on the FSC when the second data is requested. The method may include receiving the second data and the third data and transmitting the second data and the third data to the FSC.

18 Claims, 5 Drawing Sheets

SYSTEM AND METHOD FOR DATA CACHING

CROSS-REFERENCE TO RELATED APPLICATION

This application claims the benefit of the filing data of U.S. Provisional Patent Application 61/324,073, filed Apr. 14, 2010, which is hereby incorporated by reference.

TECHNICAL FIELD

The present disclosure is directed, in general, to data caching and retrieval systems and methods, such as retrieval of very complex product lifecycle (PL) or other data.

BACKGROUND OF THE DISCLOSURE

Improved systems for distributed access to data are desirable.

SUMMARY OF THE DISCLOSURE

Various disclosed embodiments include systems, methods, and apparatuses for policy based assembly data population to pre-defined file cache servers. These can include the abilities to pre-configure and define specific data selection policies based on Bill of Materials and Assembly configuration rules, scheduling capabilities to populate the caches at pre-determined times, and one-to-many cache destinations for the resulting population. Disclosed embodiments improve performance of the client data access response times for remote users of identified data by populating caches within LAN proximity of the users and avoiding multiple requests for authentication and data from the primary stored volume disks, which could be across high latency networks. One caching aspect disclosed herein models a second access data flow, without an initial first access user request normally associated with cache population strategies.

Disclosed embodiments include systems, methods, and computer readable mediums. A method includes receiving a first pre-caching rule from a policy database, receiving first data corresponding to the first pre-caching rule, and transmitting the first data to a file server cache (FSC) to be pre-cached on the FSC. The method may also include receiving a request for second data from the FSC and receiving a second pre caching rule from the policy database to be pre-cached on the FSC. The second pre-caching rule specifies third data to be pre-cached on the FSC when the second data is requested. The method may include receiving the second data and the third data and transmitting the second data and the third data to the FSC.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In many businesses, employees and other users may be geographically separated into many locations, but still require access to data that is primarily hosted on a centralized server. Because those users may require a relatively fast response for requests for data stored on the centralized server, copies of some or all of the data may be "cached" at various other geographic locations, each referred to herein as a File Server Cache (FSC). Replicated files or portions of files may be referred to herein as "stubs."

To ensure coherency between the data on the main centralized server and the data on the various FSCs, systems can use a "ticket" system. In such a system, each remote FSC must request a "read ticket" or a "write ticket" for permission to read from or write to specific data that is stored on the system that "owns" that data. By managing tickets, the system can ensure, for example, that a piece of data is not being written to by one system at the same time that it is being read by another system. In many cases, the tickets must be issued by the owning site even if the data is stored and accessible at a local FSC, to ensure that all the FSCs maintain a consistent set of data.

In some systems, each access to a multisite file results in a ticket generation call to the owning site. In many cases, this doubles the amount of inter-system communication ("chat") even though the files are local. Further, storing multiple copies of the same file in various volumes as replicas can drive the storage costs in an "n-square" fashion. More efficient storage can be accomplished by caching the file under a single Server Cache (SC), and only moving portions of the data to individual, local FSCs as that data is needed.

Systems and methods disclosed herein include techniques for "pre-caching" specific data at local FSCs, while avoiding both the delays associated with conventional caching techniques and the inefficiencies of storing unnecessary copies of other data.

Figure 1:
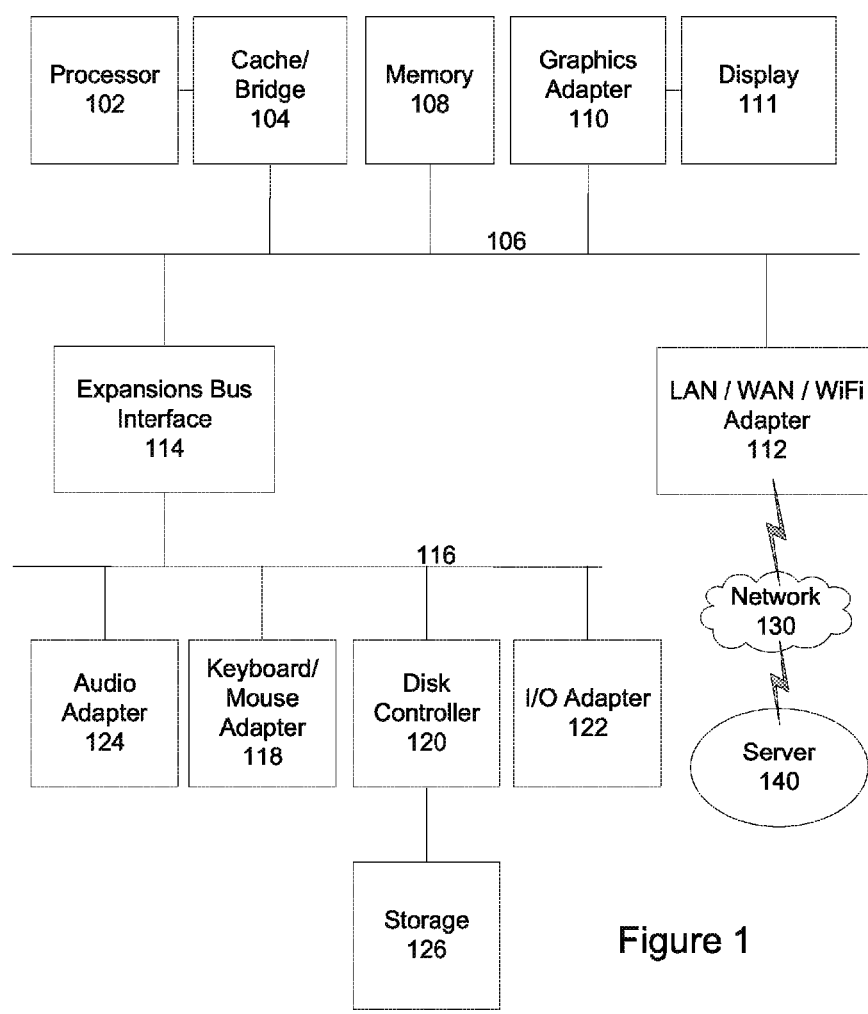
FIG. 1 depicts a data processing system in which an embodiment can be implemented.

FIG. 1 depicts a block diagram of a data processing system in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, or similar network adapter, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Various embodiments allow only desired data to be populated in caches and implement an improved file caching design for file management services.

Some caching behaviors required the data to pass-through the cache as a result of a user action to check-in or check out the data, which would populate the caches as the data passed through the system and file server caches. Because some systems could not selectively populate, users pushed all new data to every site, every night.

Disclosed embodiments allow the data of interest by a customer/user to be pre-selected based on criteria to be populated to specific file server caches, and to schedule the population to occur at a desired time to allow for network optimization by transferring during off-usage hours.

Figure 2:
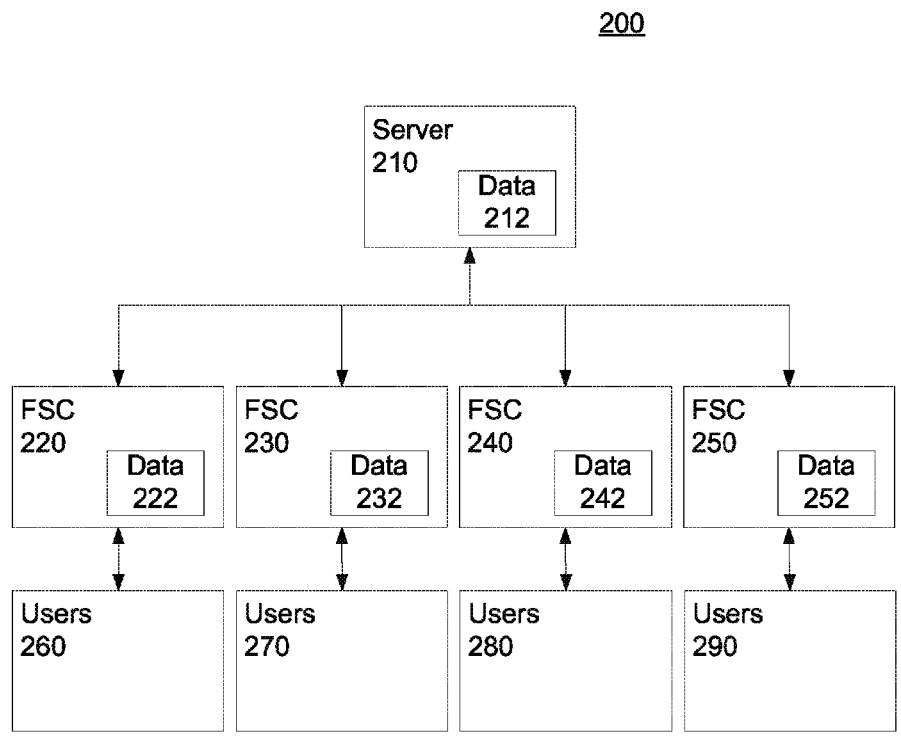
FIG. 2 illustrates an example multi-cache system that can implement disclosed embodiments.

FIG. 2 illustrates an example multi-cache system 200 that can implement disclosed embodiments. In this figure, server 210 is the primary data store for data 212. Server 210 communicates with a plurality of FSCs, including FSC 220 (with data 222), FSC 230 (with data 232), FSC 240 (with data 242), and FSC 250 (with data 252). The FSCs can be geographically diverse from each other and from server 210. In this example, server 210 is considered the "owner" of the data 212, though those of skill in the art will recognize that in this example, and in the other embodiments discussed herein, there can be multiple different servers that each own some data, and in fact each FSC may be the owner of its own data. In different embodiments, each FSC may act as a cache for data it does not own, and as the server for data it does own. In this example, the server 210 also manages tickets for the data it owns, though in other implementations, a separate system can be used as the read/write ticket manager.

Each of these FSCs is accessed by a plurality of users, shown here as users 260, 270, 280, and 290, respectively, referring to the user's data processing system.

Each of the FSCs can act as a cache for some or all of the data 212 stored on server 210, and can thereby improve performance for the respective users since data can be accessed more locally than on the server 210. However, this improvement is only realized for data that is actually cached at the local FSC so that the user gets a "hit" when accessing the data from the FSC. If the requested data is not cached on the local FSC, the user's request is a "miss", and the local FSC must first retrieve the requested data from the server 210.

Figure 3:
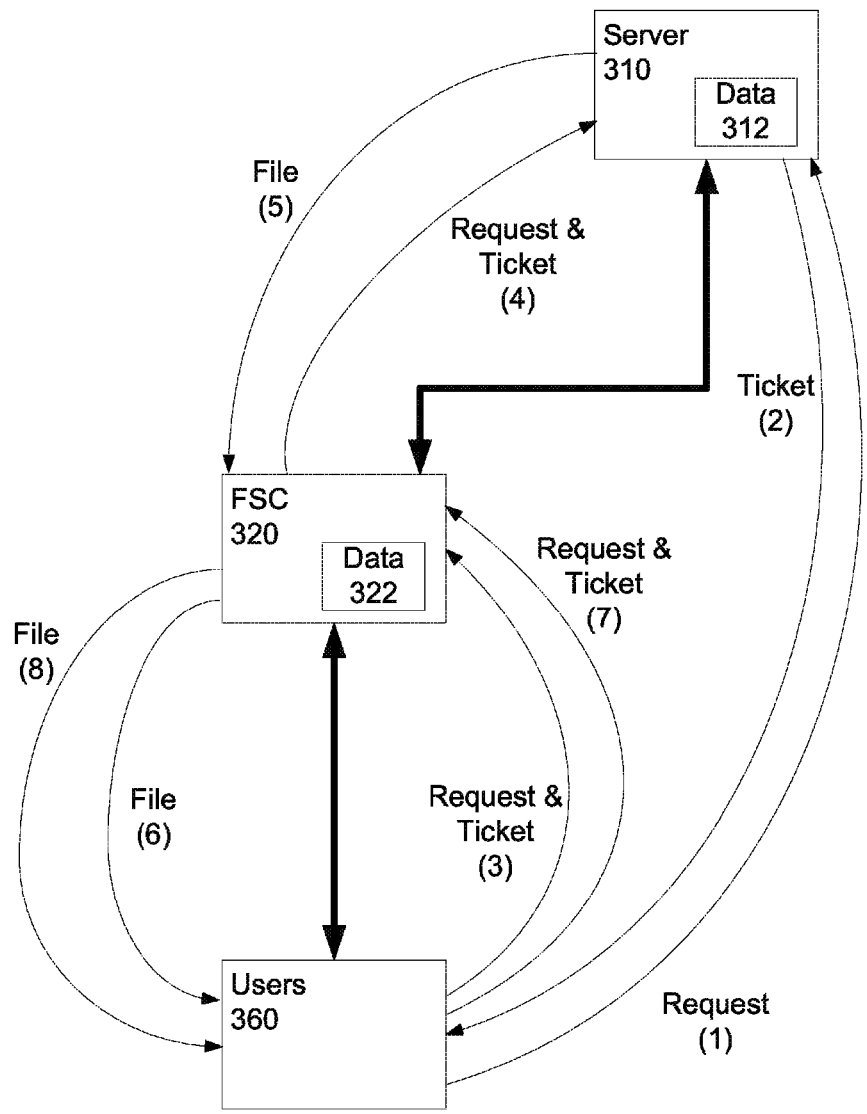
FIG. 3 illustrates a process with a "first access with cache miss" and a "second access with a cache hit"

FIG. 3 illustrates a "first access with cache miss" process and a "second access with a cache hit" process, using a single illustrative server 310 with data 312, a single FSC 320 with data 322, and a user 360, with curved lined indicating various communications. In such a process, the first time the user 360 desires specific data from FSC 320, a read request (1) is sent from user 360 to server 310, which sends a read ticket (2) back to user 360. This process illustrates a less-efficient process without the benefit of pre-populations.

User 360 then sends the read ticket to FSC 320 with a request (3) for the data. Typically, on the first request, the result is a "miss" since data 322 doesn't include the requested data. FSC 320 then forwards the read ticket and data request to server 310.

Server 310 responds with the requested data from its data 312, indicated herein as a "file" (5), but can actually be a single file, multiple files, a portion of a file, or a combination of these. Server 310 sends the file to FSC 320 for storage in data 322.

FSC 320 then sends the file to the user 360, as requested (6). This process is relatively slow, but should only occur the first time the data is accessed during a given retention period.

Note that in this case, the user must wait until all transfers have completed, including the request for data from FSC to the server, and the response of the server to the FSC. This can be a significant delay.

On the next access, assuming it occurs during the time that data is retained at FSC 320, the user 360 can obtain a read ticket from server 310 and send it to FSC 320 (7). Since FSC 320 has already stored the filed in data 322, FSC 320 can immediately send the file to user 360 (8), for a much faster cached access. This can be summarized as a "second access cache hit".

Disclosed embodiments include systems and methods that use a rules-based process to pre-cache data at each FSC to eliminate or reduce the number of first-access delays as described above. Populating the caches before a user makes a first request allows higher performance for the user/client applications loading the requested data due to the data being in a File Server Cache local to the user, which will typically be within a LAN with better latency than accessing data from the server.

Figure 4:
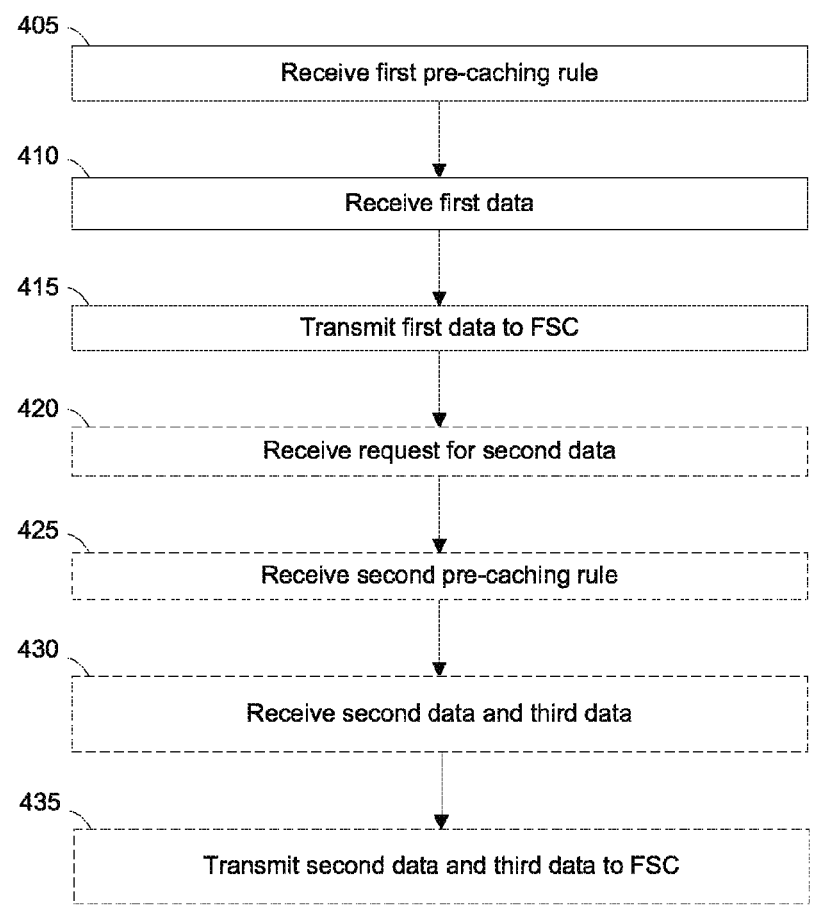
FIG. 4 depicts a flowchart of a pre-caching process in accordance with disclosed embodiments.

FIG. 4 depicts a flowchart of a process in accordance with disclosed embodiments. Note that this process does not include "ticketing" processes as described herein, since they are not required for all embodiments, but additional processes for ticketing or other housekeeping or coherency functions could be included in the processes described herein.

In this embodiment, a server data processing system receives at least a first pre-caching rule from a policy database (step 405). The first pre-caching rule defines first data to be pre-cached at a file server cache (FSC) without waiting for a request from a user or other system. In many implementations, this will include receiving a plurality of pre-caching rules that correspond to a plurality of different FSCs. The first pre-caching rule can include, for example, a scheduling rule specifying when the first data is to be pre-cached on the FSC, and can include a rule specifying that the first data is always to be updated and pre-cached on the FSC.

The server receives the first data corresponding to the first pre-caching rule (step 410). This can include loading the first data from a primary database accessible to the server.

The server transmits the first data to the FSC to be pre-cached, according to the first pre-caching rule (step 415).

In some embodiments, the server receives a request for second data from the FSC (step 420). In this example, the "second data" represents data that was not pre-cached on the FSC, and so has been requested from the server.

The server receives a second pre-caching rule from the policy database in response to the request (step 425). The second pre-caching rule specifies third data to be pre-cached on the FSC when the second data is requested. For example, second pre-caching rule can specify additional PLM or BOM data to be pre-cached on an FSC when related data is requested by the FSC. As an additional example, the second data can correspond to a BOM subassembly, and the third data can correspond to a related BOM subassembly.

The server receives the second data and the third data (step 430).

The server transmits the second data to the FSC in response to the request, and also transmits the third data to the FSC to be pre-cached on the FSC (step 435).

Figure 5:
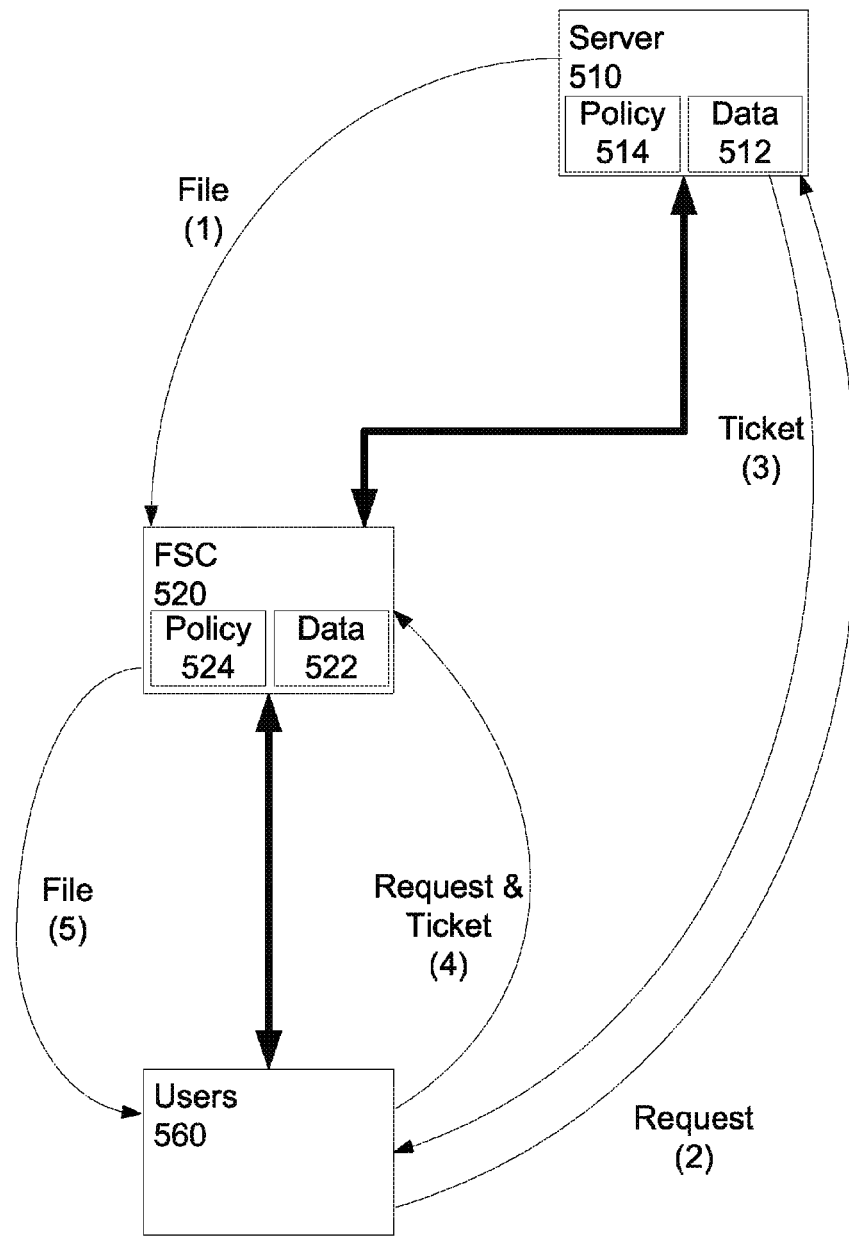
FIG. 5 illustrates a "first access cache hit" process in accordance with disclosed embodiments.

FIG. 5 illustrates a process in accordance with disclosed embodiments, using a single illustrative server 510 with data 512, a single FSC 520 with data 522, and a user 560. In such a process, server 510 can also include a policy database 514; in various embodiments, FSC 520 can also include a policy database 524.

The policy database 514 includes rules that describe what data should be pre-cached to FSC 520 (and other attached FSCs), and the conditions for performing the pre-caching.

Policy database 524 can include similar rules specific to that FSC, and can be used as the complement to the server-based pre-caching described below. That is, in some embodiments, the server 410 sends data to be pre-cached at FSC 520 according to its policy database 514, and can do so without requiring a specific request from ESC 520. In some embodiments, FSC 520 requests specific data (including acquiring any needed read tickets) from server 510 based on its policy database 524, and so is the system that is initiating the pre-caching transfer of data. Those of skill in the art will recognize that when only a server-based or FSC-based pre-caching process example is described herein, the complementary process is also intended to be included.

Server 510 pre-caches data at FSC 520 according to the rules of policy database 514, examples of which are described below, shown here as a file (1).

FIG. 5 illustrates "second access cache hit" process. The first time the user 560 desires specific data from ESC 520, a read request is sent from user 560 to server 510 (2), which sends a read ticket back to user 560 (3).

User 560 then sends the read ticket to FSC 520 with a request for the data (4). Typically, according to disclosed embodiments, the result is a "hit" even on the first request, since the requested file has been pre-cached in data 522. FSC 520 then sends the file to the user 560 (5), as requested. This process is performed as quickly on the first read as could be performed on the second read in other systems.

Note that, in the process of FIG. 5, the pre-caching file transfer (1) occurs before the user makes a request, so the user is not waiting for this to occur. By eliminating the request, ticket, and file exchange between the FSC and server at the time of the user's request, the pre-caching enables the user to receive the requested file much more quickly.

Note also that the processes of FIGS. 3 and 5 include a ticketing process, but such tickets are not required in all implementations.

The pre-caching rules stored in a policy database can base pre-caching processes on many different considerations. A simple rule could be a scheduling rule that indicates that certain data should be pre-cached in the FSC every night. This is useful, for example, in systems where the FSCs purge some or all of the cache on a regular basis, and ensures that the correct, current data is pre-cached on the FSC every day, hour, or other interval.

Other rules can be based on the content of the data itself, and the data that is usually required at each FSC. For example, a product lifecycle management (PLM) system will typically manage very large amounts of data for specific products, including such information as a bill of materials (BOM) specifying all or part of the entire product assembly, often in a tree structure and often including multiple product options and variants. A PLM system may also include data with information on environmental or energy costs of producing, operating, or disposing of a product. In such a case, the pre-caching rules stored in the policy database can specify, for example, that specific product data is pre-cached to the FSC, since that is the data that is expected to be accessed by the users of that FSC.

Similarly, other rules can specify a dynamic pre-caching based on the actual requests made by the users. For example, if the data is PLM data including a BOM for a product, the user of the client PLM data processing system may only work on specific assemblies or subassemblies of the product at a time, and has no need or desire to access the entire BOM for the product. On the other hand, a user accessing a specific subassembly of a product may often also need access to other subassemblies that are part of the same BOM tree or subtree. A pre-caching rule may specify, for example, that if a user requests the BOM data for a specific subassembly, such as the "second data" above, then the BOM data for other subassemblies in the same BOM tree are pre-cached to the FSC, such as the "third data" above, since it is likely that the user will also require that data.

Other embodiments provide a similar mechanism to cache the files based on policies and have defined caches always populated avoiding the scheduling aspect of the invention.

Other embodiments push every piece of data to every cache regardless of need or access requirements making every cache equal in terms of content.

In some embodiments, the read ticket process to the server is eliminated. Instead, the FSC is pre-cached with data according to policy database rules. Read requests from users are automatically granted at the FSC without a read ticket, and cached files are automatically transferred. In some cases, if another user writes to a specific file, a "lock" ticket is sent to the server and to any other FSCs that cache that file, locking the file until the newly-written version is synchronized ("synced") to the server and re-cached to the appropriate FSCs.

Receiving, as used herein and unless otherwise specified, can include loading from storage, receiving from another system or process, receiving via an interaction with a user, and other processes or operations to receive the specified information. The various steps of the processes described herein, unless otherwise specified, may be omitted, repeated, performed concurrently, sequentially, or in a different order. The various aspects, elements, and processes of the embodiments described herein may be individually or entirely combined, as may be specified by the claims below.

The following are incorporated by reference: U.S. Pat. No. 7,634,479, U.S. Patent Publication 2009/0222624, U.S. Patent Publication 2009/0228647, U.S. Pat. Nos. 6,631,451, 7,552,235, 6,470,426, U.S. Patent Publication 2001/00005046, and "Efficient web content delivery using proxy caching techniques" found at time of filing at
    http://ieeexplore.ieee.org/xpl/
freeabs_all.jsp?tp=&arnumber=1310442&isnumber=29092

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a server data processing system connected to communicate with a file server cache (FSC) data processing system, comprising:
    receiving a first pre-caching rule from a policy database;
    receiving first product assembly data corresponding to the first pre-caching rule, the first product assembly data corresponding to a first subassembly of a product;
    transmitting the first product assembly data to the FSC to be pre-cached on the FSC according to the first pre-caching rule, wherein the first pre-caching rule includes a scheduling rule specifying when the first product assembly data is to be pre-cached on the FSC and specifying that when the user requests the first product assembly data, then third product assembly data, corresponding to a second subassembly of the product and part of a common bill-of-materials data structure as the first product assembly data, should be transmitted to the FSC to be pre-cached on the FSC; and
    transmitting the third product assembly data to the FSC to be pre-cached on the FSC according to the first pre-caching rule.

2. The method of claim 1, wherein the first pre-caching rule defines the first product assembly data to be pre-cached at the FSC without waiting for a request from a user or other system.

3. The method of claim 1, further comprising:
    receiving a request for second product assembly data from the FSC;
    receiving a second pre-caching rule from the policy database, the second pre-caching rule specifying that the third product assembly data should be pre-cached on the FSC when the second data is requested;
    receiving the second product assembly data and the third product assembly data; and
    transmitting the second product assembly data and the third product assembly data to the FSC.

4. The method of claim 3, wherein the second product assembly data and the third product assembly data is product lifecycle management data including multiple product options and variants.

5. The method of claim 3, wherein the second data corresponds to a bill-of-materials (BOM) subassembly of a product, and the third data corresponds to a related BOM subassembly of the product.

6. The method of claim 1, further comprising receiving a read request, corresponding to the first product assembly data, from a user, and sending a read ticket, corresponding to the first product assembly data, to the user.

7. A server data processing system connected to communicate with a file server cache (FSC) data processing system, comprising:
   a processor;
   an accessible storage device storing a policy database; and
   a network adapter connected to communicate with the FSC, the server data processing system configured to
      receive a first pre-caching rule from the policy database;
      receive first product assembly data corresponding to the first pre-caching rule, the first product assembly data corresponding to a first subassembly of a product;
      transmit the first product assembly data to the FSC to be pre-cached on the FSC according to the first pre-caching rule, wherein the first pre-caching rule includes a scheduling rule specifying when the first product assembly data is to be pre-cached on the FSC and specifying that when the user requests the first product assembly data, then third product assembly data, corresponding to a second subassembly of the product and part of a common bill-of-materials data structure as the first product assembly data, should be transmitted to the FSC to be pre-cached on the FSC; and
      transmit the third product assembly data to the FSC to be pre-cached on the FSC according to the first pre-caching rule.

8. The server data processing system of claim 7, wherein the first pre-caching rule defines the first product assembly data to be pre-cached at the FSC without waiting for a request from a user or other system.

9. The server data processing system of claim 7, further configured to
   receive a request for second product assembly data from the FSC;
   receive a second pre-caching rule from the policy database, the second pre-caching rule specifying that the third product assembly data should be pre-cached on the FSC when the second product assembly data is requested;
   receive the second product assembly data and the third product assembly data; and
   transmit the second product assembly data and the third product assembly data to the FSC.

10. The server data processing system of claim 9, wherein the second product assembly data and the third product assembly data is product lifecycle management data including multiple product options and variants.

11. The server data processing system of claim 9, wherein the second product assembly data corresponds to a bill-of-materials (BOM) subassembly, and the third data corresponds to a related BOM subassembly.

12. The server data processing system of claim 7, further configured to receive a read request, corresponding to the first product assembly data, from a user, and send a read ticket, corresponding to the first product assembly data, to the user.

13. A non-transitory computer-readable medium storing computer-executable instructions that, when executed, cause a server data processing system to perform the steps of:
   receiving a first pre-caching rule from a policy database;
   receiving first product assembly data corresponding to the first pre-caching rule, the first product assembly data corresponding to a first subassembly of a product;
   transmitting the first third product assembly data to the FSC to be pre-cached on the FSC according to the first pre-caching rule, wherein the first pre-caching rule includes a scheduling rule specifying when the first product assembly data is to be pre-cached on the FSC and specifying that when the user requests the first product assembly data, then third product assembly data, corresponding to a second subassembly of the product and part of a common bill-of-materials data structure as the first product assembly data, should be transmitted to the FSC to be pre-cached on the FSC; and
   transmit the third product assembly data to the FSC to be pre-cached on the FSC according to the first pre-caching rule.

14. The computer readable medium of claim 13, wherein the first pre-caching rule defines the first product assembly data to be pre-cached at the FSC without waiting for a request from a user or other system.

15. The computer readable medium of claim 13, further comprising:
   receiving a request for second product assembly data from the FSC;
   receiving a second pre-caching rule from the policy database, the second pre-caching rule specifying that the third product assembly data should be pre-cached on the FSC when the second data is requested;
   receiving the second product assembly data and the third product assembly data; and
   transmitting the second product assembly data and the third product assembly data to the FSC.

16. The computer readable medium of claim 15, wherein the second product assembly data and the third product assembly data is product lifecycle management data including multiple product options and variants.

17. The computer readable medium of claim 15, wherein the second product assembly data corresponds to a bill-of-materials (BOM) subassembly, and the third product assembly data corresponds to a related BOM subassembly.

18. The computer readable medium of claim 13, further comprising receiving a read request, corresponding to the first product assembly data, from a user, and sending a read ticket, corresponding to the first product assembly data, to the user.

* * * * *